June 30, 1964  G. R. PIPES  3,138,949
COMBINATION RADIATOR AND CLOSURE TESTING DEVICE
Filed May 10, 1957  2 Sheets-Sheet 1

INVENTOR.
GEORGE R. PIPES
BY
ATTORNEY

June 30, 1964　　　　G. R. PIPES　　　3,138,949
COMBINATION RADIATOR AND CLOSURE TESTING DEVICE
Filed May 10, 1957　　　　　　　　　　　　2 Sheets-Sheet 2

INVENTOR.
GEORGE R. PIPES
BY
*Joseph R. Fragro*
ATTORNEY

United States Patent Office 3,138,949
Patented June 30, 1964

3,138,949
COMBINATION RADIATOR AND CLOSURE
TESTING DEVICE
George R. Pipes, South Euclid, Ohio, assignor to Eaton
Manufacturing Company, Cleveland, Ohio, a corporation of Ohio
Filed May 10, 1957, Ser. No. 658,261
11 Claims. (Cl. 73—40)

This invention relates to apparatus for testing the sealed cooling systems of internal combustion engines, to locate the exact point of any leak which may develop in the cooling system including hose connections, closure devices, pressure relief valve, and the like.

To provide high thermal efficiency in the operation of present high compression internal combustion engines, a sealed cooling system is generally provided, comprising a radiator, circulating pump, water hose, filler neck, and a removable closure device. When the engine is in operation, such systems usually operate at a predetermined pressure of approximately 5 to 20 p.s.i. The radiator filler spout closure device is provided with a relief valve set to open at a predetermined pressure to allow the steam to escape to the atmosphere through an overflow tube. The development of a leak any place in such a cooling system would result in a large loss of the coolant liquid, and reduction of engine efficiency. Therefore, it is essential that such sealed pressure cooling systems be free from leaks.

One of the principal objects of the present invention is to provide a self-contained, small, compact, easily operated apparatus, particularly adapted to quickly test the radiator, hose connections, water pump, engine block and head cooling passages, and the like, to detect and locate leaks, and with the same self-contained unit check the filler neck closure device and its valves to detect and locate any leakage occurring within said closure device or at its contact with the sealing surface of the filler spout.

A further object of the invention is to provide a combination self-contained testing apparatus, one end of which is arranged with adapter means which may readily be received by the filling spout of the radiator in the same manner as the conventional radiator closure is received by the filler spout. The opposite end of the testing apparatus is arranged with a pump to provide pressure for testing a conventional radiator closure device.

Further, the invention contemplates adapter means mounted upon the end of the pump to receive a conventional radiator filler spout in the same manner as the conventional closure is received by the filler spout of the radiator.

Other objects and advantages will become apparent from the following description in which reference is made to the drawings, in which.

Figure 1:
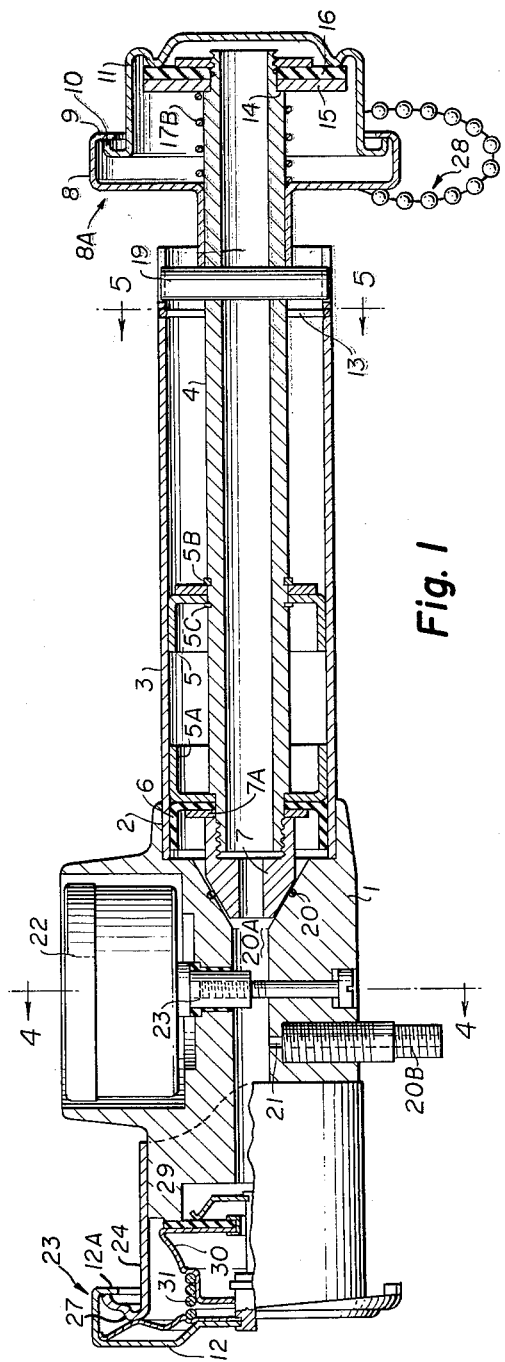
FIG. 1 is a side elevational view taken in section along the longitudinal axis of a preferred form of the testing device embodying the principles of the invention.
Figure 2:
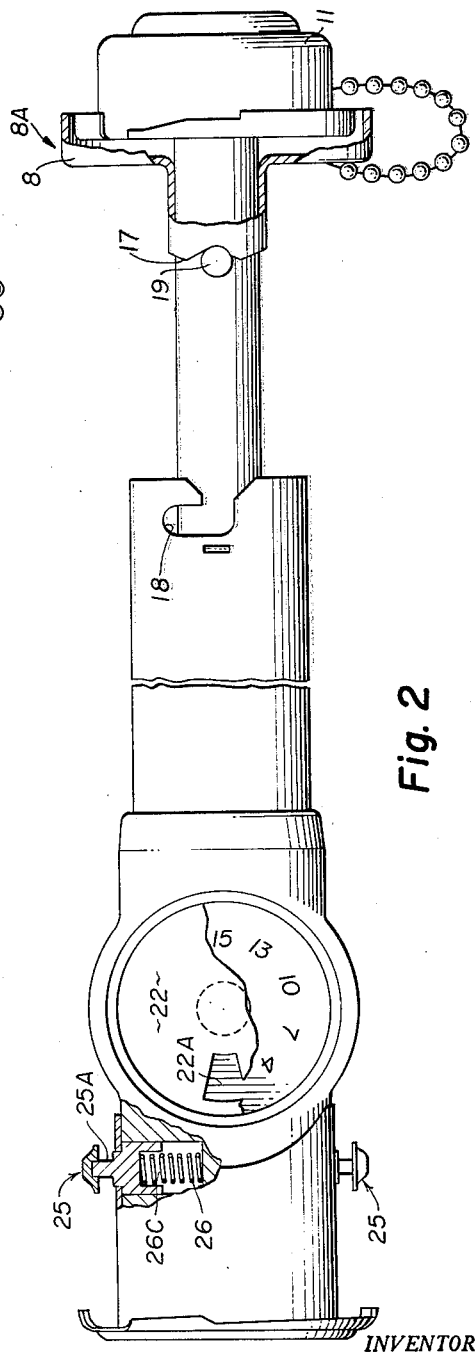
FIG. 2 is a plan view of the device shown in FIG. 1 with certain portions thereof being broken away.
Figure 3:
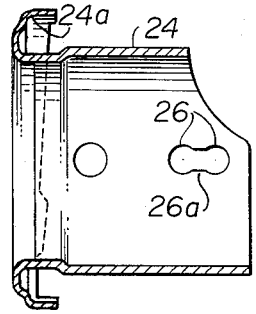
FIG. 3 is a side elevational view of an adapter sleeve located at the lower end of the device showing the locking cams to receive the radiator closure device.
Figure 4:
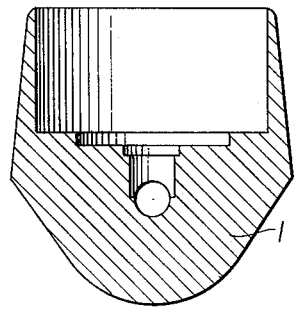
FIG. 4 is a cross-sectional view of the frame taken at lines 4—4 on FIGURE 1.
Figure 5:
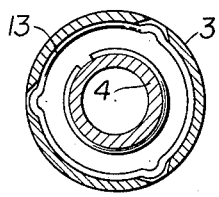
FIG. 5 is a cross sectional view of the device taken at 5—5 on FIGURE 1.
Figure 6:
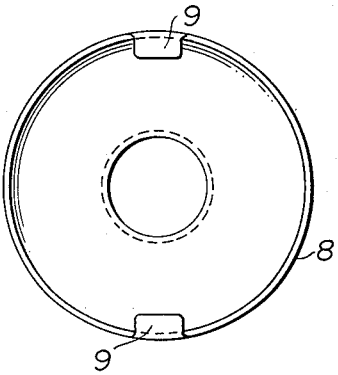
FIG. 6 is an elevational view of an adapter member at the upper end of the device with fastening lugs to receive the filler spout of the radiator.
Figure 7:
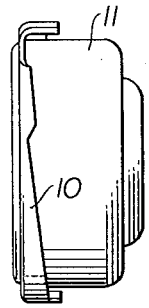
FIG. 7 is a side elevational view of a closure which cooperates with the adapter member.
Figure 8:
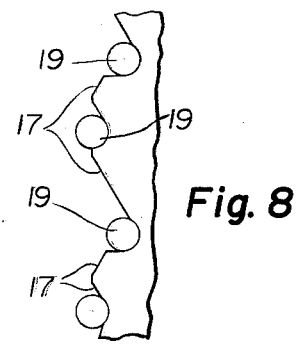
FIG. 8 is a developed view of adjusting cams carried by the adapter member.

Attention is now directed to the drawings for more specific details of the invention, wherein there is illustrated a testing device which includes a frame member 1, preferably made from a die casting provided with bore 2 receiving a pump assembly comprising pump cylinder 3, hollow piston rod 4, piston rod guides 5 and 5A, and a non-metallic sealing piston 6 which is secured with guide 5A to piston rod 4 by internally threaded valve member 7 and thrust plate 7A. Guide 5 is held in place on piston rod 4 by snap rings 5B and 5C. The opposite end of the piston rod 4 is provided with an adapter means or adapter means 8A comprising member 8 having lugs 9 cooperating with cams 10 on closure 1 shown in FIG. 7. Closure 11 is also used as a handle when operating the pump assembly to test a radiator closure device 12, is removed when the testing device is to be used for testing cooling systems including the radiator and the like. When testing cooling systems the adapter member 8 of the testing device is placed over a conventional filler spout of a cooling system and rotated clockwise for locking engagement of lugs 9 with appropriate cam means of the filler spout. Complete removal of the piston rod 4 from pump cylinder 3 is prevented by snap ring 13. The outer end of the piston rod 4 is provided with a shoulder 14 abutting a steel washer 15 supporting a non-metallic sealing washer 16. Since the dimensions of cams on a radiator filler spout may vary from that of cams 10 on closure 11, cams 17 cooperating with a transverse pin 19 are provided to vary the position of adapter member 8 relative to sealing washer 16. Spring 17B maintains contact between cams 17 and pin 19. Pump cylinder 3 is provided with a locking slot 18 to receive pin 19 when the piston rod 4 is advanced to the end of its full inward stroke and rotated clockwise to lock the piston rod 4 in fixed position. Within frame member 1 is an air chamber 20A having located at one end thereof a non-metallic valve seat 20 cooperating with valve member 7. An air line valve 20B is provided with a passage 21 to air chamber 20A and it may be attached to air hose connected to an air pump or other source of air supply (not shown) to supply the desired pressure within the cooling system to be tested. A pressure gauge 22 has a movable dial face disposed beneath a pointer window 22A and is communicable with air chamber 20A so that the air pressure within the cooling system is registered and readable through pointer window 22A, thus allowing the operator to see that the system is holding the required pressure. A second adapter means 23 comprising a sleeve 24 slideably mounted upon the outer end of frame member 1, and cams 24A thereof engage lugs 12A to secure the closure device 12 to the adapter sleeve 24. Two spring loaded locking pins 25 located diametrically opposite one another are received in holes 26 of adapter sleeve 24 in a selected fixed position. Adapter sleeve 24 may be moved endwise by depressing the locking pins 25 inwardly to allow the reduced diameter 25A thereof to enter the slot 26A permitting endwise adjustment of adapter sleeve 24 to change the distance between the sealing surface 27 of adapter sleeve 24 and sealing rib 29 at the outer end of frame member 1 to accommodate closure devices of different lengths. Closure device 12 is provided with relief valve 30 set to open at a predetermined pressure by calibrated spring 31. Since one of the basic novel aspects of this testing device is its use for testing sealed cooling systems and also for testing closure devices, each mode of operation will be considered separately.

When the testing device is used as a cooling system tester, pin 19 is disposed in a locking position with locking slot 18 so that valve member 7 is disposed in sealed relationship with valve seat 20. Closure 11 is then removed from adapter member 8 and is allowed to hang free by a chain 28. Cams 17 are adjusted with respect to pin 19 to accommodate the locking cams on the filler spout and the adapter member 8 is placed on the filler spout of the radiator in the same manner as the radiator closure device would be installed. Due to the compressability of air and the relatively large volume of automotive cooling system, it is necessary to introduce compressed air through valve 20B by an air hose from any air pressure supply generally available at most all service stations. Although the air supply available at most service stations ranges in pressure from 90 to 100 p.s.i., the test pressure will not exceed the rated cooling system pressure since a previously tested and accepted closure device installed on adapter sleeve 24 acts as a safety valve and relieves all but the necessary testing pressure. After the pressure has been introduced and the air supply line removed, a static pressure will be maintained with the cooling system if there are no leaks. If there is a leak in the system, the pressure will drop and the rate of pressure drop will also indicate the size of the leak.

When the testing device is used as a testing means for the radiator closure device 12, the closure 11 is placed upon adapter member 8 and the piston 6 is withdrawn to its full outer stroke. Adapter sleeve 24 is then adjusted to the proper position by means of locking pins 25 and holes 26 to receive the closure device 12 to be tested and piston rod 4 is then advanced to its full inner stroke bringing valve member 7 into contact with valve seat 20. Piston rod 4 is then rotated clockwise to engage pin 19 and locking slot 18 and a static pressure is held within the testing device, thus allowing the operator to observe the indicator of the pressure gauge 22 for pressure drop, indicating a leak in the closure device 12 being tested.

As a practical matter, when a cooling system and radiator closure device are to be tested, the closure device 12 is generally tested first and is replaced if found to be defective. The tested closure device is retained on the novel testing device when the cooling system is being checked. This procedure insures that the cooling system is being tested under operating pressure conditions because if an excessive amount of compressed air is applied to the system, any amount above the pressure rating of the closure device is immediately allowed to escape.

In summary, the novel testing device disclosed herein utilizes the same structural elements to test a sealed cooling system or a sealing type radiator closure device.

While the present invention has been described in connection with certain specific embodiments, it is to be understood that the foregoing description is merely exemplary and that the concept of this invention is susceptible of numerous other modifications, variations, and applications which will be apparent to persons skilled in the art. The invention is to be limited therefore, only by the broad scope of the appended claims.

What I claim is:

1. A pressure testing device comprising a body portion, means on said body portion to receive a filler spout of a cooling radiator, means on said body portion to receive a radiator closure, piston pump means disposed in said body portion, air inlet means, and air chamber means disposed in said body portion and communicating with said filler spout receiving means, said closure receiving means, said pump means and said air inlet means.

2. A pressure testing device comprising a hollow body, a piston pump assembly at one end of said hollow body, adapter means on said pump assembly for receiving a filler spout of a sealed cooling system radiator, the opposite end of the hollow body having second adapter means for receiving a conventional radiator closure device of a sealed cooling system, an air chamber within the hollow body between the pump assembly and the opposite end of the hollow body, said air chamber being in communication with each of said adapter means, a valve located on the innermost end of the piston of said pump assembly, sealing means mounted on the wall of said air chamber for receiving said valve to seal the air pressure therein when the piston of the pump assembly is fully advanced to the end of its stroke, and locking means for locking said piston in sealed position.

3. The testing device according to claim 2, together with a pressure gauge mounted upon said hollow body, said pressure gauge having a passage in communication with said air chamber.

4. The testing device according to claim 2, together with a closure removably attached to the outer end of the piston of said pump assembly.

5. The testing device according to claim 2 wherein said second adapter means is adjustable to receive conventional radiator closure devices of different lengths.

6. The testing device according to claim 2 wherein the first mentioned adapter means is adjustable to receive conventional radiator filler spouts of different lengths.

7. A single unit combination testing device comprising an air pump mounted within the device, adjustable adapter means for receiving a radiator filler spout at one end of the device, second adjustable adapter means at the other end of the device arranged to simultaneously receive a radiator closure, and a pressure chamber communicating with each of the adapter means and said air pump.

8. The pressure testing device according to claim 7 together with a hollow piston rod for said air pump providing an air passage therethrough from the pressure chamber to a cooling system associated with the radiator filler spout.

9. A pressure testing device comprising a hollow body fitted on one end thereof with adapter means for receiving a filler spout of a radiator of a sealed cooling system, second adapter means arranged upon the opposite end of the device for receiving a radiator closure at the same time said first mentioned adapter means is operatively arranged with said radiator filler spout, an air chamber having a wall portion within the hollow body in communication with each of said adapter means, a piston pump assembly within the hollow body, a valve located on the innermost end of the piston of said pump assembly, sealing means mounted on said wall of the air chamber for sealing the air pressure therein when said piston is advanced to the end of the stroke, locking means for locking said piston in sealed relation to the air chamber, and an air line valve fitting mounted upon the hollow body having a passage in communication with said air chamber.

10. A combination radiator and closure testing device comprising a single unit provided with adjustable adapter means for receiving a radiator filler spout at one end thereof, second adjustable adapter means at the opposite end of the device for receiving a closure device, axially moveable pump means disposed intermediate the ends of the device, and chamber means in communication with each of said adapter means and said pump means so that when the chamber means is pressurized, the radiator filler spout and the closure device are both in communication with the pressurized chamber means.

11. A pressure testing device comprising a hollow body, a piston pump assembly at one end of said hollow body having adapter means fitted for receiving the filler spout of a sealed cooling system, second adapter means fitted at the other end of the hollow body for receiving a sealed cooling radiator closure device having a pressure relief valve therein set to open at a predetermined pressure, an air chamber within the hollow body in communication with each of said adapter means, and means to supply air pressure to said air chamber so that when said air chamber is pressurized, the sealed cooling system and the radiator closure device are simultaneously under pressure.

References Cited in the file of this patent

UNITED STATES PATENTS

| | | | |
|---|---|---|---|
| 717,760 | Phipps | Jan. 6, | 1903 |
| 2,446,219 | Eaton | Aug. 31, | 1948 |
| 2,760,367 | Stromberg | Aug. 28, | 1956 |
| 2,784,731 | Bealer | Mar. 12, | 1957 |
| 2,847,851 | Enell | Aug. 19, | 1958 |
| 2,893,238 | Kayser | July 7, | 1959 |
| 2,940,301 | Hughes | June 14, | 1960 |
| 2,940,303 | Enell | June 14, | 1960 |
| 3,014,361 | Black | Dec. 26, | 1961 |

OTHER REFERENCES

Publication: "Pres-Sure-Tite Tester," Pressure Tite Products, Detroit, Mich., January 1955.